United States Patent Office

3,365,649
Patented Jan. 23, 1968

3,365,649
CURRENT AND VOLTAGE REGULATING CIRCUIT
William Shaw, Sudbury, Middlesex, England, assignor to Sprague Electric Company, North Adams, Mass., a corporation of Massachusetts
Filed Apr. 3, 1964, Ser. No. 357,323
6 Claims. (Cl. 321—16)

ABSTRACT OF THE DISCLOSURE

A first detector whose input is initially delayed to limit surges, compares a voltage, responsive to load current, with a reference voltage so as to control the output of an SCR bridge, which supplies the load, and to provide constant load current until the voltage output of a second detector, responsive to load voltage, exceeds this reference voltage and biases the first detector to provide constant load voltage.

---

This invention relates to rectifying equipment.

For certain electrochemical purposes and especially for some processes associated with the production of electrolytic capacitors it is necessary to supply a load, of which the resistance changes with the coulombs passed, with a constant direct current until such time as a specified voltage across the load is reached, after which the voltage must remain constant at the specified value and the current must consequently change.

It is a main object of the present invention to provide a rectifier device which, from a fixed alternating current input, will supply an output meeting this requirement entirely automatically, so that there is no need for continuous mechanical or manual control.

The invention accordingly provides a rectifier device arranged to supply a load, of which the resistance varies with the coulombs passed through the load, with a constant direct current until a predetermined voltage across the load is reached and thereafter with a current which maintains that voltage, the device comprising a rectifying means supplying current to the load, a first detector having an output responsive to the current through the load, means for controlling the voltage output of the rectifying means in dependence on the first detector output, means for delaying the supply of power to said first detector on switching on of the device to prevent current surges, and a second detector having an output responsive to load voltage, the two detectors being so connected that the second detector output biases the first detector output after but not before the predetermined voltage across the load is reached.

To permit the invention to be more readily understood and carried into effect, an illustrative embodiment thereof is described below, with reference to the accompanying drawings, in which.

Figure 1:
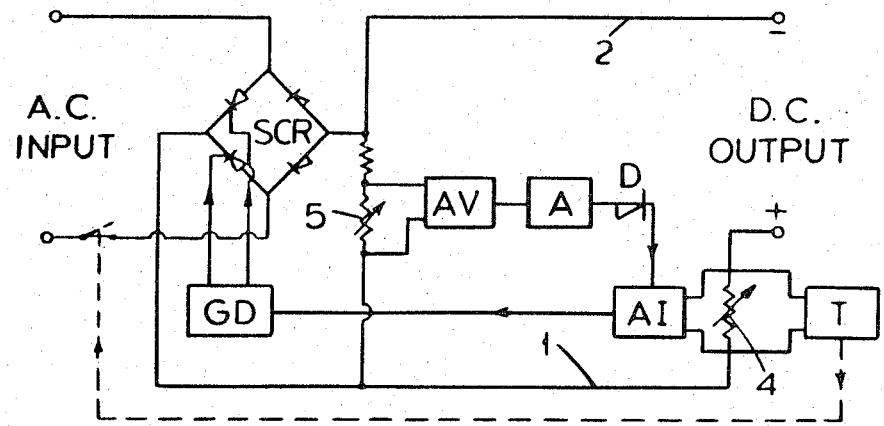
FIGURE 1 is a block diagram of the complete rectifier unit.

As shown in FIGURE 1, the direct current for the load is derived from a silicon controlled rectifier SCR fed from A.C. supply mains, if necessary through a transformer. The rectifier is arranged as a bridge circuit, so as to supply a heavy load current by way of output lines 1 and 2. The current in the load is detected in terms of the voltage across a low value resistor 4 in series with the load, and the voltage across the load is detected in terms of the voltage across a resistor 5, which is part of a potentiometer connected across the load.

The voltage across the resistor 4 is applied to a current controlling differential amplifier, which is designated in the figures as current amplifier, and there compared with a reference voltage. The D.C. output voltage of the current amplifier is determined by the difference between the applied and the reference voltages and goes to a gate drive unit which supplies firing pulses to the silicon controlled rectifier SCR thereby determining the rectifier output. A decrease in load current will reduce the voltage across the resistor 4 and the arrangement is such that this reduction results in an increased difference voltage, that is, in an increased amplifier output voltage. The gate drive consequently has a higher voltage output, permitting earlier firing of the silicon controlled rectifier, thus, raising its output voltage and also the load current. Circuit paramaters are chosen so that exact correction is obtained, so that as long as the current amplifier is permitted to function without interference, the current passed through the load will remain constant.

The voltage across resistor 5 is applied to a second differential amplifier, or voltage controlling amplifier which is designated in the figures as voltage amplifier. The applied voltage is compared in the amplifier with a reference voltage, the difference between the voltages again determining the D.C. output voltage of the amplifier. The arrangement here however is such that the output voltage is increased by an increase in the load voltage.

The output voltage from the voltage amplifier is fed through a buffer amplifier and diode D to the point in the current amplifier which determines the reference voltage. This reference voltage biases the diode D to make it non-conducting until the buffer amplifier output voltage exceeds the reference voltage. Thus the buffer amplifier output voltage can have no influence on the current amplifier until this condition is met. When this diode D becomes conducting, the reference voltage of the current amplifier will be determined by the output voltage of voltage amplifier and therefore by the load voltage. The circuit parameters are so chosen that the diode D becomes conducting when the voltage across the load has reached a value which it is desired to keep constant. As long as the diode is conducting, an increase in voltage across the load will cause an increase in the D.C. output of the voltage amplifier and therefore in that of the buffer amplifier. The buffer amplifier output voltage is negative as regards the reference voltage of the current amplifier so that this increase reduces the effective reference voltage in the current amplifier and so decreases its D.C. output. The decreased control voltage consequently supplied to the gate drive unit causes this to feed lower voltage firing impulses to the rectifier SCR, causing later firing and a reduced voltage supply to the load. Parameters are chosen to maintain precise correction.

A load of which the resistance varies with the coulombs passed through it, can therefore be supplied by the rectifier arrangement described with a constant direct current until a predetermined voltage across the load is reached, and thereafter with a current just sufficient to maintain the predetermined voltage.

This second phase, of voltage control, normally requires to be continued for a predetermined time at the end of which the current must be switched off. To render this phase automatic, a timing control can be provided. This comprises a time clock or timing circuit the input to which is the voltage detected across resistor 4. When this voltage begins to fall corresponding to the attainment of the constant output voltage stage, the timing clock is set in operation; after an adjustable predetermined delay, a relay is energized to interrupt the A.C. supply to the rectifier SCR.

Figure 2:
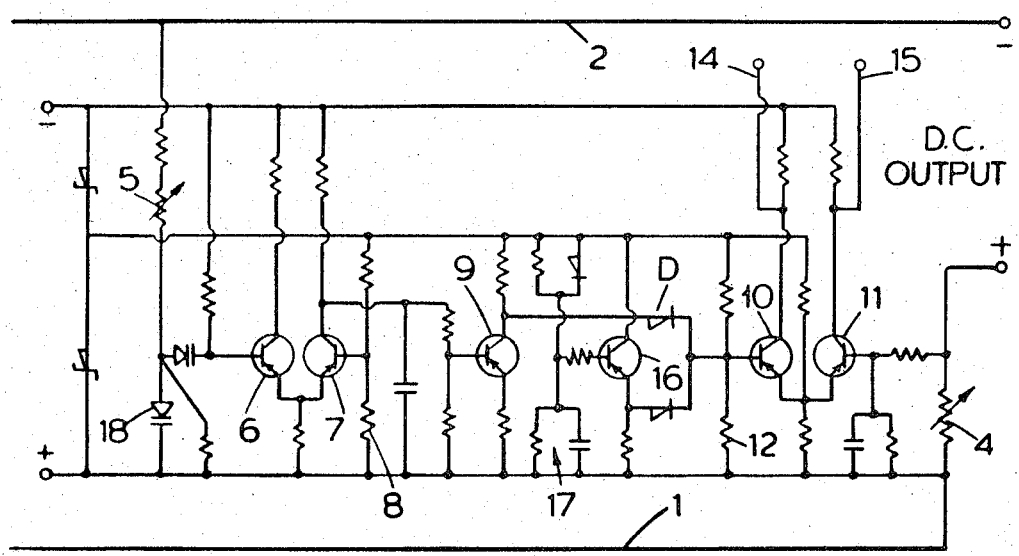
FIGURE 2 is a simplified circuit diagram of the control amplifier arrangement.

FIGURE 2 shows the circuits of the current amplifier, the buffer amplifier and the voltage amplifier. The latter comprises a differential amplifier having two transistors 6 and 7 with emitters connected through a common resistor to the positive side of a D.C. supply. The voltage detected across the resistor 5, in a circuit extending between the rectifier output lines 1, 2, is applied to the base of transistor 6, and the reference voltage, developed across resistor 8, is applied to the base of transistor 7. The output voltage is taken from the collector circuit of the transistor 7 to the base of a transistor 9 constituting the buffer amplifier, and the output voltage of transistor 9 is taken from its collector circuit to the diode D.

The current amplifier, which is also a differential amplifier, resembles the voltage amplifier in comprising a pair of transistors 10, 11 with emitters connected to a positive supply through a common resistor. The voltage detected across the resistor 4 is applied to the base of transistor 11 and the reference voltage, developed across resistor 12 is applied to that of transistor 10, as is the output of the diode D. The difference voltage output of the current amplifier is taken from the collector circuits of transistors 10, 11 to the gate drive by way of leads 14, 15.

As will be evident, the current amplifier is effectively isolated from voltage amplifier so long as the voltage output of the buffer amplifier is insufficient to overcome the blocking effect on the diode D of the reference voltage developed across resistor 12.

In the circuit arrangement shown in FIGURE 2, the transistor pairs 6, 7 and 10, 11 operate in each case to amplify the difference between a reference voltage and the detected voltage as described with respect to FIGURE 1. Thus, the voltage across resistor 4 decreases with decreasing load current and the difference between it and its reference voltage (across resistor 12) increases so as to deliver increased voltage output of transistors 10 and 11 to the gate drive which, in turn, provides increased rectifier output and thus, constant load current.

On the other hand, as the voltage across resistor 5 increases, in response to increased load voltage, the difference between it and its reference voltage (across resistor 8) is increased, thereby providing increased output from the transistors 6 and 7, which is delivered in turn through buffer amplifier 9 to diode D. As indicated with regard to FIGURE 1, the output of this differential amplifier is negative with respect to the reference voltage of the current amplifier, in this case that of transistor 10 and 11, and must exceed this reference voltage which biases diode D so as to block its conduction. Once the output of the differential amplifier pair 6 and 7, as delivered by transistor 9, exceeds the reference voltage of transistor 10, diode D conducts and a new reference voltage is provided the current amplifier, which, in turn, decreases its output and provides constant load voltage.

The circuit shown in FIGURE 2 also includes means for suppressing voltage or current surges when the apparatus is switched on. This comprises a transistor 16 the current through which is controlled by a bias, applied to the base of the transistor, derived from a charging RC circuit 17. When the transistor 16 is conducting, it will offer a low impedance path to the power supply to transistors 10 and 11 of the current amplifier by which this supply is effectively shorted. The current amplifier thus initially provides no output to the gate drive, which therefore delivers no signal to the rectifier bridge SCR, the output of which is conseqently zero. The time constant of the RC circuit 17 is however such that within a few cycles sufficient bias is built up to render the transistor 16 non-conducting. The power supply to the current amplifier is correspondingly built up, enabling a control output to be fed to the gate drive unit through leads 14, 15 so that the rectifier SCR can function.

Also included in the circuit of FIGURE 2 is a Zener diode 18, the function of which is to clamp at a reasonable value voltages which might otherwise reach the detectors through misuse of the setting controls.

What is claimed is:
1. A rectifier device arranged to supply a load, of which the resistance varies with the coulombs passed through the load, with a constant direct current until a predetermined voltage across the load is reached and thereafter with a current that maintains that voltage, the device comprising: a rectifying means supplying direct current to said load; a first detector having an output responsive to load current, said first detector output derived by comparison between a voltage responsive to said load current and a first reference voltage, and said first detector output increasing with decreasing load current; means for delaying the supply of power to said first detector on switching on the device to prevent current surges; means for controlling the voltage output of said rectifying means in dependence on said first detector output; a second detector having an output responsive to load voltage, said second detector output derived by comparison between a voltage responsive to load voltage and a second reference voltage, said second detector output increasing with increasing load voltage, and said second detector output being negative with respect to said first reference voltage; and means applying said second detector output to said first detector to decrease said first reference voltage thereby decreasing said first detector output, said applying means biased by said first detector reference voltage to block said second detector output voltage unless this exceeds said reference voltage thereby biasing said first detector after but not before said predetermined load voltage is reached whereby said first detector output maintains said load current constant until said second detector output exceeds said reference voltage and thereafter maintains said load voltage constant.

2. A device as claimed in claim 1 wherein said first detector comprises a pair of transistors connected in the common emitter mode, the reference voltage being applied to the base of one transistor, the detected voltage being applied to the base of the other transistor, and the output voltage being taken from the collector circuits of said transistors; and said applying means includes a blocking diode coupling said second detector output to the base of said one transistor, and said first reference voltage biases said diode to block said second detector output voltage.

3. A device as claimed in claim 2 wherein said delaying means includes a third transistor provided across the power supply of said first detector, said third transistor having a controlled bias derived from an RC charging circuit such that said third transistor initially provides a low impedance path to said supply and effectively shorts it.

4. A device as claimed in claim 3 in which the rectifying means is a silicon controlled rectifier, the voltage output thereof being controlled by firing impulses received from a gate drive means to which the first detector output is applied.

5. A device as claimed in claim 4 in which the rectifying means comprises said silicon controlled rectifier and other rectifying elements connected in a bridge circuit.

6. A device as claimed in claim 3 having a timing unit arranged to disconnect the rectifying means from the A.C supply thereto a predetermined time after the predetermined voltage across the load is reached.

References Cited
UNITED STATES PATENTS

| | | | |
|---|---|---|---|
| 2,774,032 | 12/1956 | Burdgy | 323—4 |
| 3,185,912 | 5/1965 | Smith et al. | 321—18 |
| 3,199,015 | 8/1965 | Lackey et al. | 321—19 |
| 3,218,540 | 11/1965 | Jackson | 321—18 |

JOHN F. COUCH, *Primary Examiner.*

M. WACHTELL, *Assistant Examiner.*